(12) United States Patent
Smedley et al.

(10) Patent No.: US 6,297,980 B1
(45) Date of Patent: Oct. 2, 2001

(54) UNIFIED CONSTANT-FREQUENCY INTEGRATION CONTROL OF THREE-PHASE POWER CORRECTED RECTIFIERS, ACTIVE POWER FILTERS, AND GRID-CONNECTED INVERTERS

(75) Inventors: Keyue M. Smedley; Chongming Qiao, both of Irvine, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/632,772

(22) Filed: Aug. 4, 2000

Related U.S. Application Data

(60) Provisional application No. 60/147,623, filed on Aug. 6, 1999, and provisional application No. 60/157,321, filed on Oct. 1, 1999.

(51) Int. Cl.[7] ............................. H02M 1/12; H02M 1/14; H02M 7/68
(52) U.S. Cl. .................................. 363/89; 363/44; 363/47
(58) Field of Search ................................. 363/39, 44, 47, 363/84, 89, 90

(56) References Cited

U.S. PATENT DOCUMENTS

| | | | | |
|---|---|---|---|---|
| 5,436,550 | * | 7/1995 | Arakawa | 323/222 |
| 5,561,595 | * | 10/1996 | Smith | 363/37 |
| 6,011,707 | * | 1/2000 | Mine | 363/89 |
| 6,014,001 | * | 1/2000 | Guinet | 318/701 |
| 6,049,179 | * | 4/2000 | Kisaichi et al. | 315/307 |
| 6,177,739 | * | 1/2001 | Matsudaira et al. | 307/125 |

* cited by examiner

*Primary Examiner*—Peter S. Wong
*Assistant Examiner*—Bao Q. Vu
(74) *Attorney, Agent, or Firm*—Daniel L. Dawes, Esq.; Myers, Dawes & Andras LLP

(57) ABSTRACT

The unified constant-frequency integration (UCI) control method of the invention is based on one-cycle control. It employs an integrator with reset as its core component along with a few logic and linear components to control the pulse width of a three-phase rectifier, active power filter, or grid-connected inverter so that the three phase current draw from, or the current output to, the utility line is sinusoidal. The UCI control employs constant switching frequency and operates in continuous conduction mode (CCM) that is desirable for industrial applications.

6 Claims, 8 Drawing Sheets

UNIFIED CONSTANT-FREQUENCY INTEGRATION CONTROL OF THREE-PHASE POWER CORRECTED RECTIFIERS, ACTIVE POWER FILTERS, AND GRID-CONNECTED INVERTERS

CROSS REFERENCE TO RELATED APPLICATIONS

This is a non-provisional patent application claiming its priority from two provisional applications: (1) U.S. Provisional Application, Ser. No. 60/147,623 filed on Aug. 6, 1999 and entitled General Constant-Frequency PFC Controller for Three-Phase Boost Rectifiers; and (2) U.S. Provisional Application, Ser. No. 60/157,321 filed on Oct. 1, 1999 and entitled General Constant-Frequency PFC Controller for Three-Phase Boost Rectifiers.

BACKGROUND OF THE INVENTION

1. Field of the Invention

The invention relates to the field of 3-phase rectifiers, active power filters, and grid-connected inverters.

2. Description of the Prior Art

The invention in this document covers vast applications spanning from power factor corrected rectifiers in front of, and active power filters in parallel with, electronic equipment such as computers, communication, motion control, aviation, space electronics, and grid-connected inverters for distributed power generation.

Power Factor Corrected Rectifiers

In recent years, the usage of modern electronics equipment has been widely proliferating. The electronics equipment usually have a rectifier of single-phase or three-phases in the front end. Three-phases are more desirable for high power applications. A three-phase rectifier is a device that converts three-phase sinusoidal ac power into dc power. Traditional rectifiers draw pulsed current from the ac main as shown in FIG. 1, which causes significant harmonic pollution, low power factor, reduced transmission efficiency, harmful electromagnetic interference to neighborhood appliances, as well as overheating of transformers. In order to solve these problems, many international agencies have proposed harmonic restrictions to electronic equipment. As a result, a vast number of power factor corrected (PFC) rectifers have been proposed to comply with these regulations.

A three-phase power factor corrected rectifier is a device that converts three-phase sinusoidal ac power into dc power while the input currents are sinusoidal and unity power factor, as shown in FIG. 2. Many three-phase topologies are suitable for implementing PFC function for rectification. Usually, high frequency active switches are used in the rectifiers to realize the PFC function. The control methods that modulate the pulse width of the switches are an important issue in the power electronics research. A third harmonic injection method was reported for a dual-boost converter with center-tapped dc-link and split output capacitors. This method achieves low current distortion. However, it is not convenient to generate the third harmonic signal tuned to the right frequency and right amplitude. Hysteresis control and d-q transformation control were frequently used control approaches. Hysteresis control results in variable switching frequency that is difficult for EMI filter design. The d-q approach is based on digital implementation that leads to complicated systems. An analog control method with constant switching frequency modulation was reported for a particular rectifier, where several multipliers are necessary to implement the three phase current references. Due to the disadvantages of variable frequency or complexity of implementation, three-phase PFC rectifiers are not yet commercially available.

Active Power Filters

One alternative to deal with the current harmonics generated by traditional rectifiers is to use active power filters (APF). Considering the electronic equipment with traditional rectifier as nonlinear loads to the ac main, a three-phase APF is a device that is connected in parallel to and cancels the reactive and harmonic currents from one or a group of nonlinear loads so that the resulting total current drawn from the ac main is sinusoidal as shown in FIG. 3. By comparison, it will be noted that where a PFC unit is usually inserted in the energy pass, which processes all the power and corrects the current to unity power factor, APF provides only the harmonic and reactive power to cancel the one generated by the nonlinear loads. In this case, only a small portion of the energy is processed, which may result in overall higher energy efficiency and higher power processing capability. Most APF control methods proposed previously need to sense the three-phase line voltages and the three-phase nonlinear load currents, and then manipulate the information from these sensors to generate three-phase current references for the APF. Since the reference currents have to reflect the load power of the nonlinear load, several multipliers are needed to scale the magnitude of the current references. A control loop is necessary to control the inverter to generate the reactive and harmonic current required by the nonlinear load. These functions are generally realized by a digital signal processing (DSP) chip with fast analog-to-digital (A/D) converters and high-speed calculations. The complex circuitry which results in high cost and unreliable systems, often prevents this technique from practical applications. Some approaches that sense the mains line current were reported for single-phase APF and for three-phase APF. The overall circuitry is reduced. However, multipliers, input voltage sensors are still necessary. High speed DSPs are still used in three-phase systems due to the complexity of the systems.

Grid-connected Inverters

Distributed power generation is the trend in the future in order to promote new power generation technologies and reduce transmition costs. An effective use of natural resources and renewable resources as alternatives of fossil and nuclear energy in generation of electricity has the effect of protecting the environment. In order for the alternative energy sources to impact the energy supply in the future, they need to be connected to the utility grid. Therefore, grid-connected inverters are the key elements for the distributed power generation systems.

A grid-connected inverter is a device that converts dc power to ac power of single phase or three-phases that is injected to the utility grid. In order for an alternative energy source to be qualified as a supplier, sinusoidal current injection is required as shown in FIG. 4. Again, control methods are cruicial. In the past, d-q transformer modulation based on digital implementation was often employed for a standard six-switched bridge inverter topology. The complexity results in low reliability and high cost. In addition, short-through hazard exists in this inverter.

SUMMARY OF THE INVENTION

In accordance with the present invention a unified constant-frequency integration (UCI) control method is based on one-cycle control. It employs an integrator with reset as its core component along with a few logic and linear components to control the pulse width of a three-phase recitifier, active power filter, or grid-connected inverter so that the three phase current draw from, or the current output to, the utility line is sinusoidal. No multipliers are required, as used in many control approaches to scale the current references according to the load level. Furthermore, no reference calculation circuitry is needed for controlling active power filters. The UCI control employs constant switching frequency and operates in continuous conduction mode (CCM) that is desirable for industrial applications. This control approach is simple, general, and flexible in that is applicable to many topologies with slight modification of the logic circuits, while the control core remains unchanged. Although, a DSP is not required to implement the UCI control, in some it may be desirable for other purposes. For example, the Unified Constant-frequency Control function may be realized by a low cost DSP having high reliability, particularly no high speed calculation, high speed A/D converter, or mutipliers are required. In this document, the implementations of UCI control can be roughly classified into two categories: vector control mode and bipolar control mode. A three-phase system in vector control mode has only two switches operating at switching frequency at a given time, while a three-phase system in bipolar control mode has three switches operating at switching frequency.

Power Factor Corrected Rectifiers

The power train of a three-phase rectifier is usually a boost derived three-phase converter. The UCI controller for PFC applications can control the power train in either the vector or bipolar control modes.

In the vector control mode, the boost-derived three-phase rectifiers are categorized into two groups: (1) one group can be decoupled into a series-connected dual-boost topology that features central-tapped or split dc output capacitors; and (2) the other group can be decoupled into a parallel-connected dual-boost topology that features a single dc output capacitor. The dual-boost sub-topologies rotate their connection every 60° of the line cycle depending on the line voltage states. In each 60° of ac line cycle, only two switches are switched at high frequency. Therefore, the switching loss is significantly reduced. The switches operate at a current lower than the phase current, which results in reduced current ratings and conduction losses. In the bipolar control mode, the input phase voltage, output dc voltage, and duty ratios of switches for some boost rectifiers are related by a general equation. Based on the One-Cycle Control and solutions of this general equation, which are singular and infinite, several UCI control solutions are derived for topologies such as the standard six-switch rectifier, VIENNA rectifier, etc. The UCI control method for PFC rectifiers has demonstrated excellent performance, great simplicity (an order of magnitude fewer components than prior art), and unparalleled reliability.

Active Power Filters

The UCI control approach is based on One-Cycle control and senses main currents. No multipliers nor reference calculation circuitry are required. Thus the implementaion cirucitry is an order of magnitude simpler than previously proposed control methods. The UCI control for active power filters has several solutions. One solution uses vector control mode and needs to sense the three-phase line voltage. The switching losses in vector control mode reduced. The other version uses bipolar control mode that eliminates three-phase line voltage sensors.

Grid-Connected Inverters

Grid-connected inverters with sinusoidal current output are proposed. A three-phase standard bridge inverter can be de-coupled as parallel-connected dual-buck sub-topology during each 60° of line cycle. Therefore only two switches are controlled at switching frequency in order to realize sinusoidal output with unity-power-factor. In accordance with the proposed control method, the grid-connected inverter features unity-power-factor, low current distortion, as well as low switching losses. In addition, short-through hazard is eliminated because only one of the switches in each bridge arm is controlled during each 60° of line cycle.

These and other features and advantages of the invention will become more apparent with the description of preferred embodiments and reference to the associated drawings.

Detailed Description of the Preferred Embodiments

Figure 1:
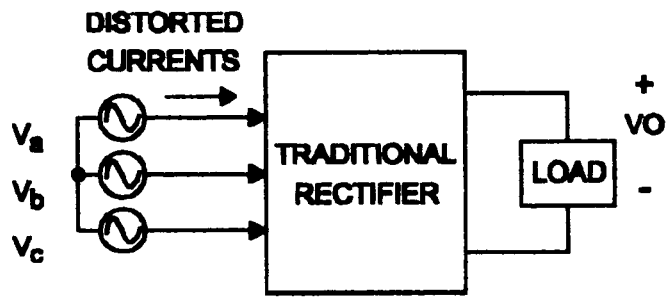
FIG. 1 is a schematic diagram of a traditional 3-phase rectifier of the prior art.
Figure 2:
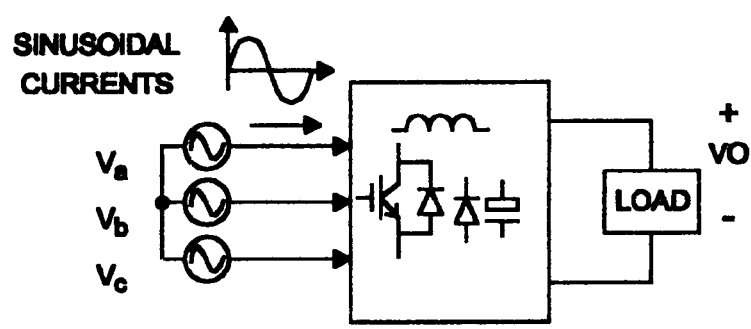
FIG. 2 is a schematic diagram of a power factor corrected 3-phase rectifier.
Figure 3:
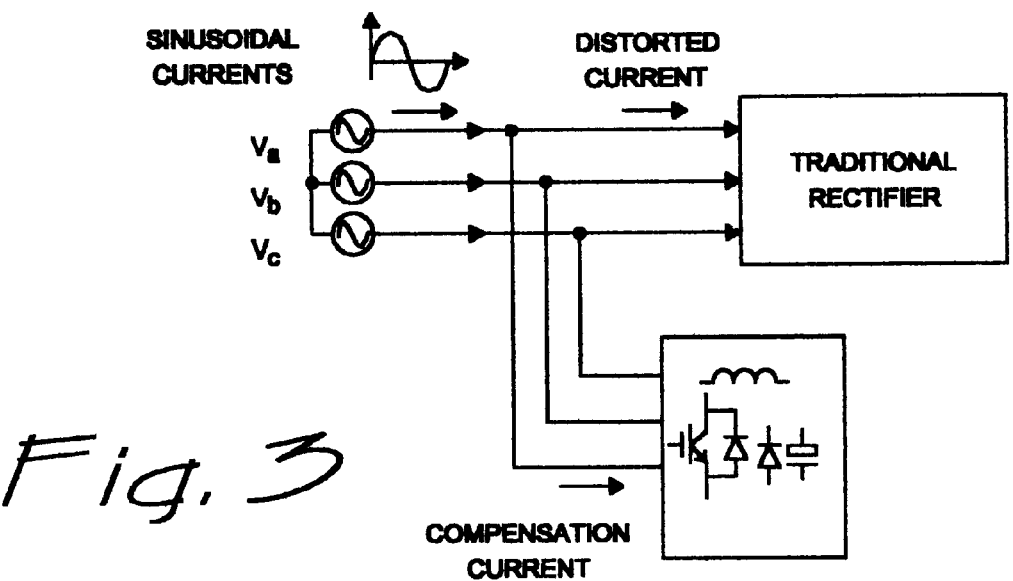
FIG. 3 is a schematic diagram of an active power filter.
Figure 4:
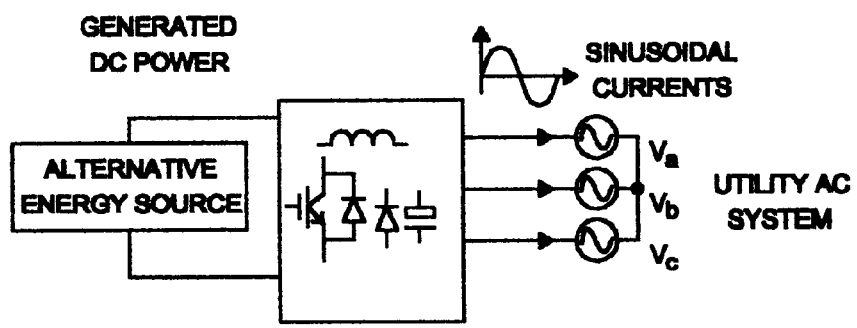
FIG. 4 is a schematic diagram of a grid-connected inverter.

The following description is organized in three parts according to the function of the respective circuits. In each part, embodiments will be discussed for both the vector control mode and the bipolar operation mode. Accordingly, this discussion will follow the general outline set forth below elements of which will be keyed to the text.

Part I. PFC Rectifiers
   1.1. Vector Control Mode
   1.2 Bipolar Control Mode
Part II. Active Power Filters
   2.1 Vector Control Mode
   2.2 Bipolar Control Mode
Part Ill. Grid-connected Inverters
   3.1 Vector Control Mode
   3.2 Bipolar Control Mode In order to facilitate a full and complete disclosure, additional discussion of the background and features of the present invention is set forth in ATTACHMENT A entitled Unified Constant-Frequency Integration (UCI) Detailed Implementation of Control of 3-phase PFC Rectifiers, Active Power Filters, and Grid Connected Inverters, which is incorporated herein by reference. A separate Table of Contents and Definition of Drawings are set forth beginning on pages i and ii, respectively, of ATTACHMENT A.

Part I. PFC Rectifiers

In its simplest terms the control method of the present invention is based on one cycle control to realize a three-phase PFC function given by:

$$\begin{bmatrix} i_a \\ i_b \\ i_c \end{bmatrix} = \frac{1}{R_e} \cdot \begin{bmatrix} v_a \\ v_b \\ v_c \end{bmatrix} \text{ or } I_s = \frac{1}{R_e} \cdot V_s$$

where $i_a, i_b, i_c$ are the three-phase source currents, $v_a, v_b$ and $v_c$ are the three-phase source voltages, and $R_e$ is the equivalent resistance by which the source is loaded; $I_s, V_s$ are matrix vectors representing the input source current and voltage.

Every converter can be described by:

$$V_s = V_c \cdot M(D)$$

where $M(D)$ is a function of the duty cycle D, which is called the conversion matrix, and Vc is the dc output voltage. This matrix is singular; thus many solutions are available. In this aspect of the invention one can combine the two equations above so that the circuit realizes the function described by:

$$I_s = \frac{V_c}{R_e} \cdot M(D)$$

If an equivalent current sensing resistor $R_s$ is used to measure the source current $i_a, i_b, i_c$, then the circuit performance can also be described by a control key equation:

$$R_s \cdot I_s = \frac{R_s \cdot V_c}{R_e} \cdot M(D)$$

where $R_s V_c / R_e$ can be expressed as $V_m$.

Comparing the frequency of $V_m$ with the switching frequency, Vm varies at much lower frequency, therefore it may be approximated by the output of the feedback compensater which is automatically adjusted whenever $R_s V_c/R_e$ has a discrepancy compared to a reference value. The control key equation can be used with any boost derived converter. For each solution of the control key equation, a control implementation is available based on One-Cycle Control. Those implementations can be roughly classified into two categories: vector control mode as shown in FIG. 5, and bipolar operation mode as shown in FIG. 6.

1.1 Vector Control Mode

Figure 5:
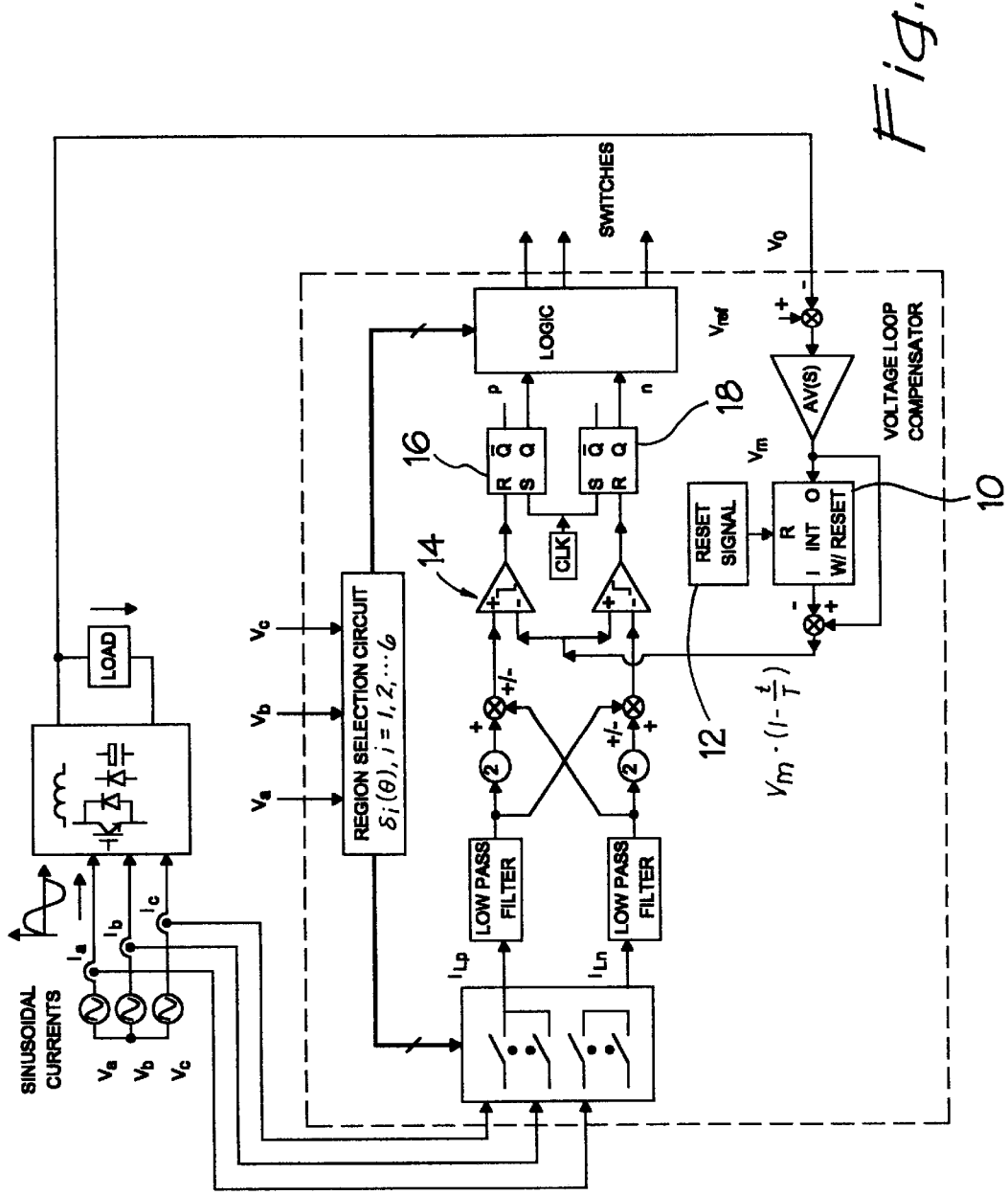
FIG. 5 is a schematic diagram of a UCI controlled PFC rectifier having a vector control mode.
Figure 6:
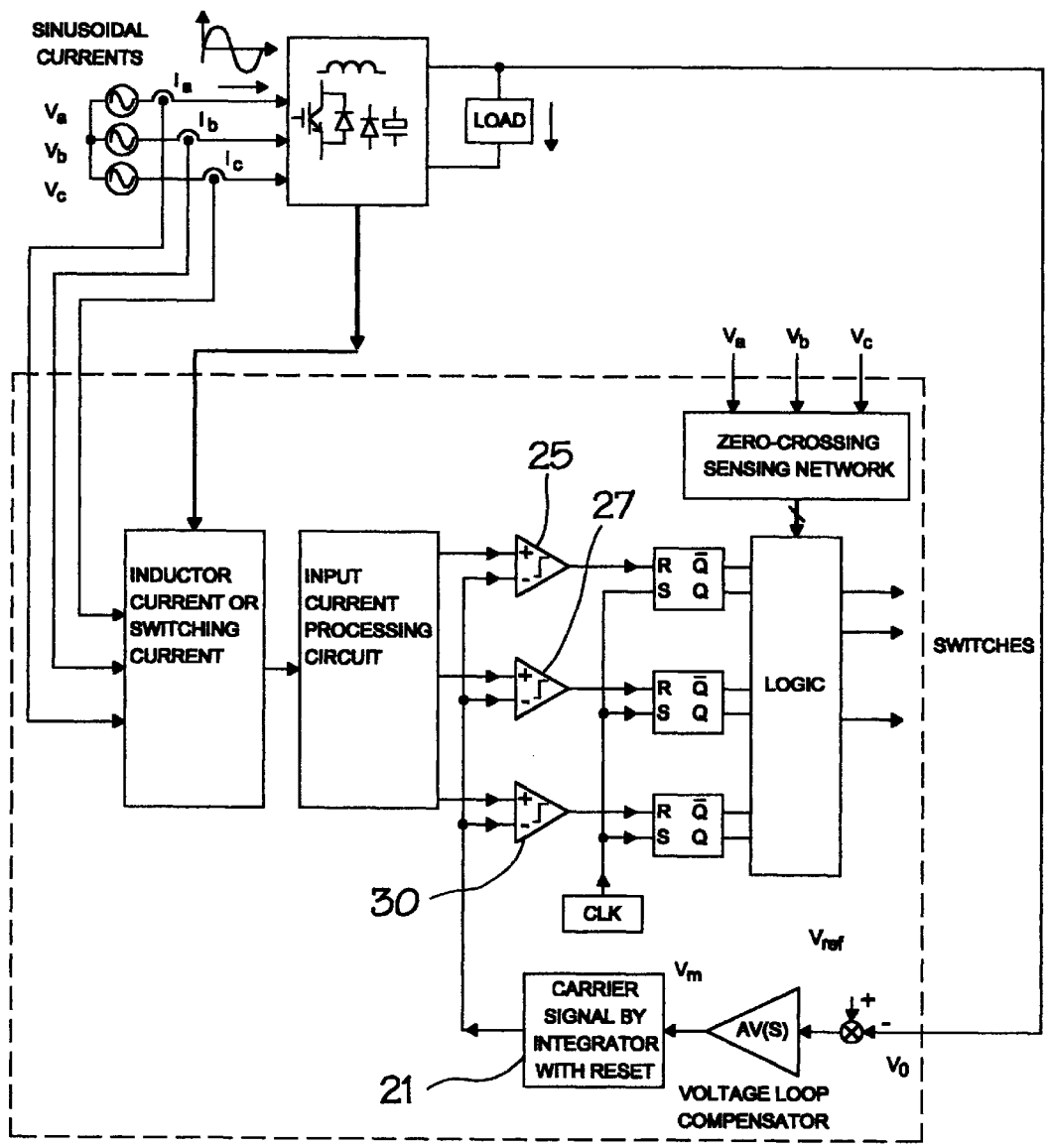
FIG. 6 is a schematic diagram of a UCI controlled PFC rectifier having a bipolar control mode.

In the embodiment of FIG. 5 the control circuit for vector control mode is comprised of an integrator 10 having an input with a reset circuit 12 having its output coupled to the input of an adder 14. The adder 14 has another input that is coupled to the input of the integrator 10. The output of the adder 14 is coupled to two comparators 16 and 18.

1.2 Bipolar Control Mode

In the embodiment of FIG. 6, the control circuit for bipolar operation mode is comprised of an integrator 21 having an input with a reset circuit and having its output coupled to the input of an adder 23. The adder 23 has another input that is coupled to the input of the integrator 10. The output of the adder 23 is coupled to three comparators 25, 27, and 30.

For vector control, the control variable rotates in each 60° of line cycle, therefore, the input voltages can be sensed and used to decouple the sensed current signals and direct the trigger signals to the right switches. For bipolar control, the control variables do not rotate, therefore no decoupling circuitry is required. In this case, voltage sensing may or may not be necessary.

Unified Constant-frequency integration (UCI) control of the power factor corrected rectifiers as described above is based on one-cycle control. This control method employs the integrator 10 with reset 12 as the core component to control the duty ratio of the PFC rectifier and to realize sinusoidal current draw from the ac source. Compared to previously proposed control methods, the UCI controller features constant switching frequency, simpler circuitry, and an absence of multipliers.

Since the input three-phase currents are controlled cycle by cycle, they match the input three-phase voltages closely, thus unity power factor and low total harmonic distortion are achieved. Experimental and simulation results show that the PFC has excellent input current waveform demonstrated using many rectifier topologies. PFC rectifiers with UCI controller provide a cost-effective, highly reliable, and flexible solution for power quality control. Due to the simplicity and generality of the circuitry, it is highly suitable for industrial production.

Digital implementation of the UCI control method can be realized by programming the control key equation and the supporting logic and linear functions, into a DSP chip. Since the control key equation and the supporting logic and linear functions, are very simple, a low cost DSP can be employed.

A more detailed discussion of the background and the features associated with this aspect of the invention is set forth in Section 1, entitled Unified Constant-frequency Integration (UCI) Control of 3-phase Rectifiers, Inverters, Active poer Filters with Unity Power Factor beginning on page 1—1 of ATTACHMENT A.

Part II. Active Power Filters

In its simplest terms the control method in this aspect of the invention is based on one cycle control to realize an APF function given by:

$$I_s = \frac{1}{R_e} \cdot V_s$$

where $I_s$ is the source current matrix, $V_s$ is the source voltage matrix and $R_e$ the equivalent resistance with which the source is loaded. Since $$I_s = I_L + I_P$$

where the current $I_P$ is current matrix generated by the APF will automatically cancel the reactive component of the nonlinear load current $I_L$.

Every converter can be described by:

$$V_s = V_c \cdot M(D)$$

where $M(D)$ is a function of the duty cycle D, which is called the conversion matrix, and where $V_c$ is the dc rail voltage. In this aspect of the invention one can combine the two equations above so that the circuit realizes the performance described by:

$$I_s = \frac{V_c}{R_e} \cdot M(D)$$

If an equivalent current sensing resistor $R_s$ is used to measure the source current $i_s$ then the circuit performance can also be described by a control key equation:

$$R_s \cdot I_s = R_s \cdot (I_L + I_P) = \frac{R_s \cdot V_c}{R_e} \cdot M(D)$$

where RsVc/Re can be expressed as Vm.

Comparing the frequency of $V_m$ with the switching frequency, Vm varies at much lower frequency, therefore it may be approximated by the output of the feedback compensater which is automatically adjusted whenever RsVc/Re has a discrepancy compared to a reference value. The key control equation can be used with any boost derived converter. For each solution, a control implementation is available based on One-Cycle Control. Those implementations can be roughly classified into two categories: vector control mode as shown in FIG. 7 and bipolar control operation mode as shown in FIG. 8.

2.1 Vector Control Mode

Figure 7:
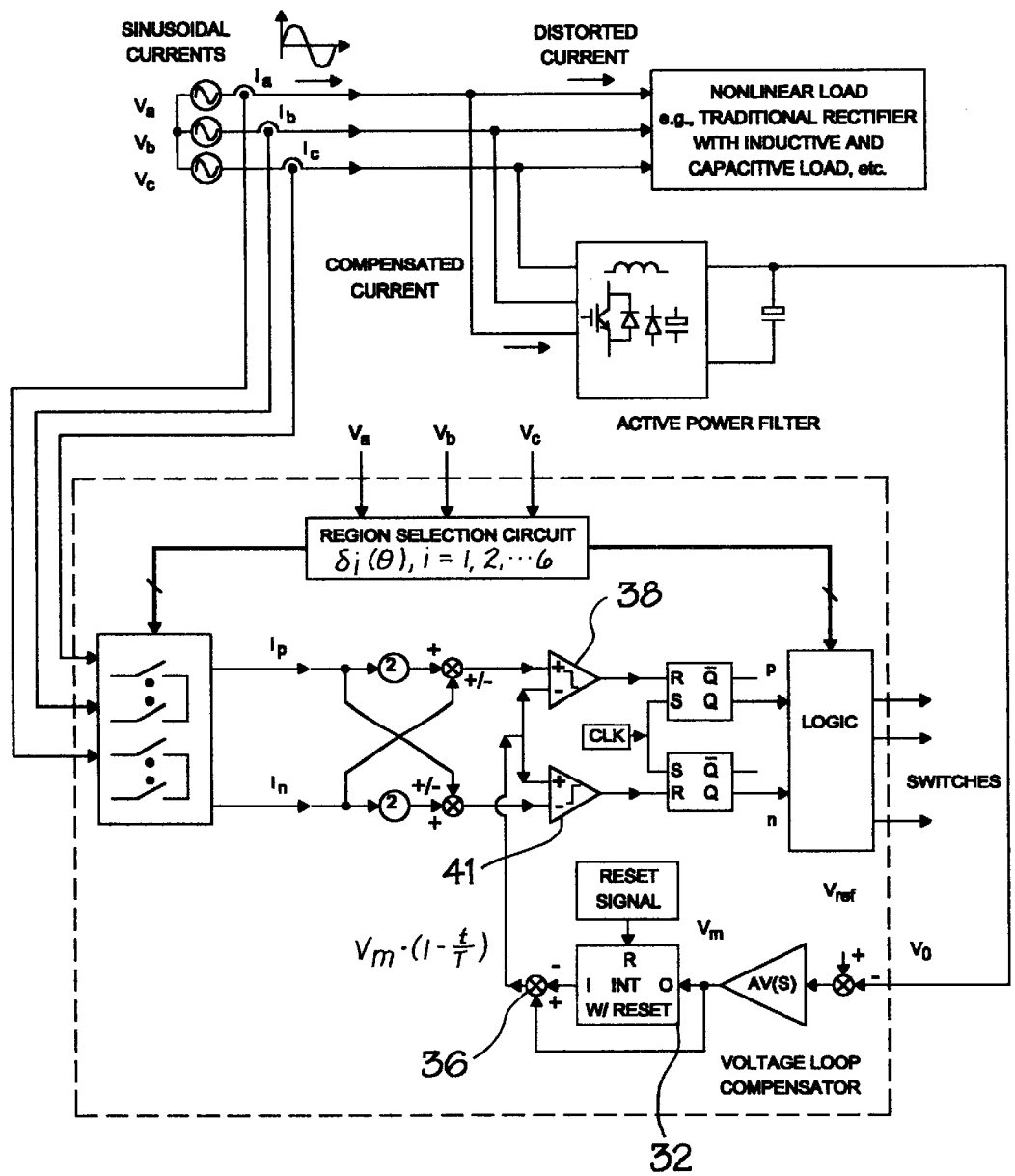
FIG. 7 is a schematic diagram of a UCI controlled active power filter in vector mode.
Figure 8:
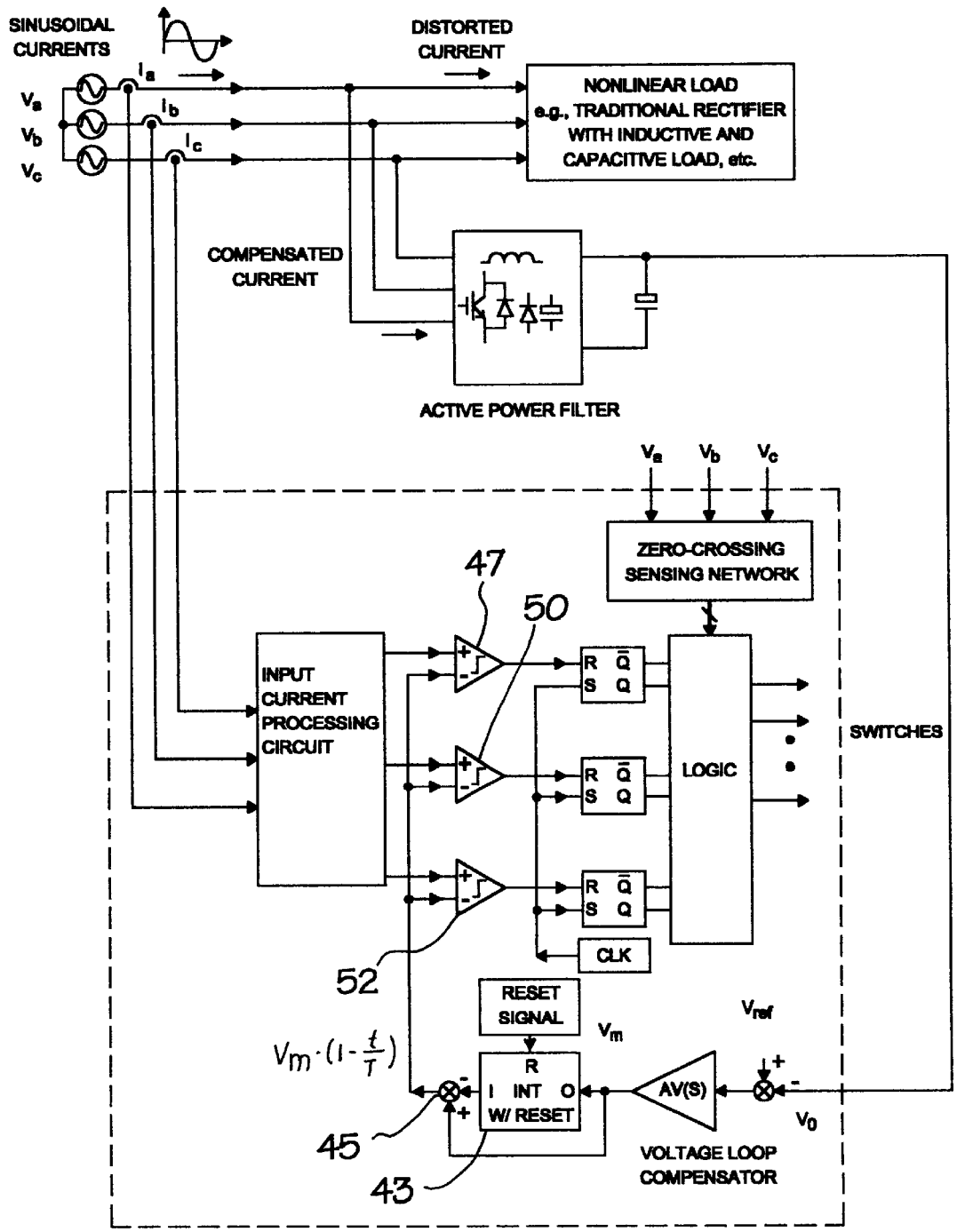
FIG. 8 is a schematic diagram of a UCI controlled active power filter in bipolar mode.

In the embodiment of FIG. 7, the control circuit for vector control is comprised of an integrator 32 having an input with a reset circuit and having its output coupled to the input of an adder 36. The adder 36 has another input that is coupled to the input of the integrator. The output of the adder 36 is coupled to two comparators 38 and 41.

2.2 Bipolar Control Mode

In the embodiment of FIG. 8, the control circuit for bipolar control is comprised of an integrator 43 having an input with a reset circuit and having an output coupled to the input of an adder 45. The adder 45 has another input that is coupled to the input of the integrator 43. The output of the adder 45 is coupled to three comparators 47, 50, 52.

For vector control, the control variable rotates in each 60° of line cycle; therefore, the input voltages can be sensed and used to decouple the sensed current signals and to direct the trigger signals to the right switches. For bipolar control, the control variables do not rotates, therefore no decoupling circuitry is required. In this case, voltage sensing may or may not be necessary.

A unified constant-frequency integration (UCI) control of the active power filter as described above is based on one-cycle control. This control method employs the integrator 43 with reset, as the core component to control the duty ratio of an active power filter and to realize net sinusoidal current draw from the ac source. Compared to previously proposed control methods, the UCI controller features simpler circuitry, with no need for multipliers, no need for generating current references that reflect the reactive and harmonic portion of the load current, and no need for sensing the load current. Since the input current compensation is performed cycle by cycle, the compensated net current matches the input voltage closely, thus a unity power factor and low total harmonic distortion are achieved. Furthermore, since voltage across the energy storage capacitor is kept constant in the steady state, minimum current generated by the APF to realize harmonic current cancellation.

Active power filters with UCI control can also damp the transient due to sudden changes in the load current. Experimental and simulation result shows that the APF has excellent harmonic filtering capability as demonstrated using many different nonlinear loads. This control method is applicable to most other APF topologies which are parallel connected in the ac side. Active power filters with UCI controller provide a cost-effective, highly reliable, and flexible solution for power quality control. Since the active power filter of this invention only processes the reactive and harmonic current, power losses and component ratings should be lower compared to active power factor correcting methods of the past. Due to the simplicity of the circuitry, it is very suitable for industrial production. For many existing nonlinear loads, unity power factor can be achieved by plugging an active filter into the ac inlet.

Digital implementation of this UCI control method can be realized by programming the control key equation and the supporting logic and linear functions, into a DSP chip. Since the control key equation and the supporting logic and linear functions are very simple, a low cost DSP can be employed.

A more detail discussion of the background and features associated with this aspect of the invention is set forth in Section 2, entitled Three-phase Power Factor Corrected Active-Power-Filter with UCI Control, and beginning on page 2—2 of ATTACHMENT A.

Part III. Grid-connected Inverters

In its simplest terms the control method in this aspect of the invention is based on one cycle control to realize an APF function given by:

$$I_s = \frac{1}{R_e} \cdot V_s$$

where is $i_s$ the three-phase ouput currents, $v_s$ the three-phase voltages and $R_e$ the equivalent resistance with which the output is loaded.

Every buck-derived converter can be described by:

$$V_s = V_c \cdot M(D)$$

where M(D) is a function of the duty cycle D, which is called the conversion matrix and $V_c$ is the input dc voltage.

If an equivalent current sensing resistor $R_s$ is used to measure the source current $I_s$, then the circuit performance can also be described by a control key equation:

$$R_s \cdot I_s = (K \cdot V_s - V_m \cdot M(D))$$

Combining the two equations above, results in the formula $$R_s \cdot I_s = \left(K - \frac{V_m}{V_s}\right) \cdot V_s$$

And the emulated resistance $R_e$ is given by $$R_e = \frac{1}{R_s}\left(K - \frac{V_m}{V_s}\right)$$

where K is a constant. Therefore, the current is following the input phase voltage.

Comparing with the switching frequency, $V_m$ varies at much lower frequency, therefore it may be approximated by the output of the feedback compensater which is automatically adjusted whenever RsVc/Re has a discrepancy compared to a reference value. The key control equation can be used with buck derived converters. For each solution, a control implementation is available based on One-Cycle Control. Those implementations can be roughly classified into two categories: vector control mode as shown in FIG. 9 and bipolar operation mode as shown in FIG. 10.

3.1 Vector Control Mode

Figure 9:
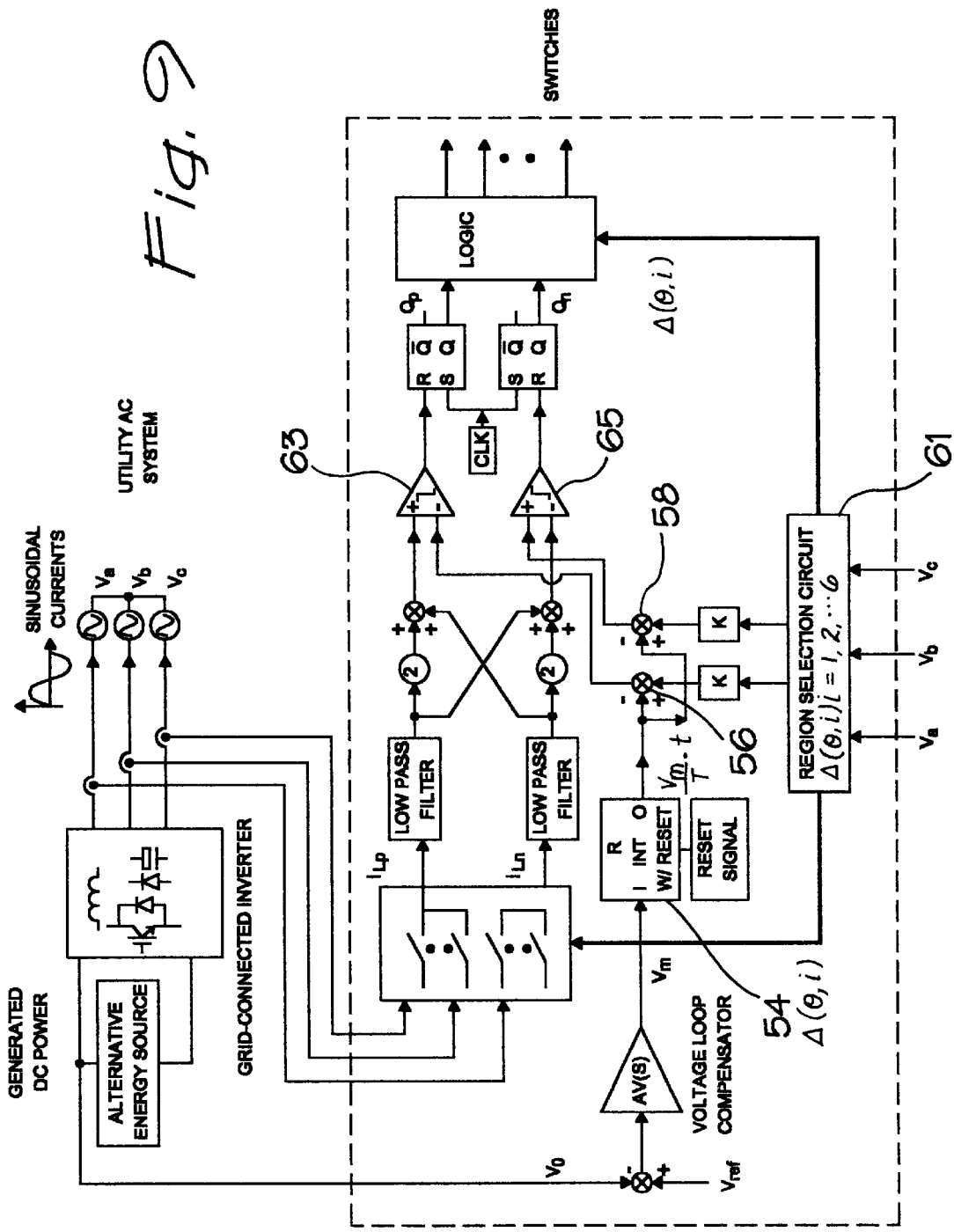
FIG. 9 is a schematic diagram of a UCI controlled grid-connected inverter having a vector control mode.
Figure 10:
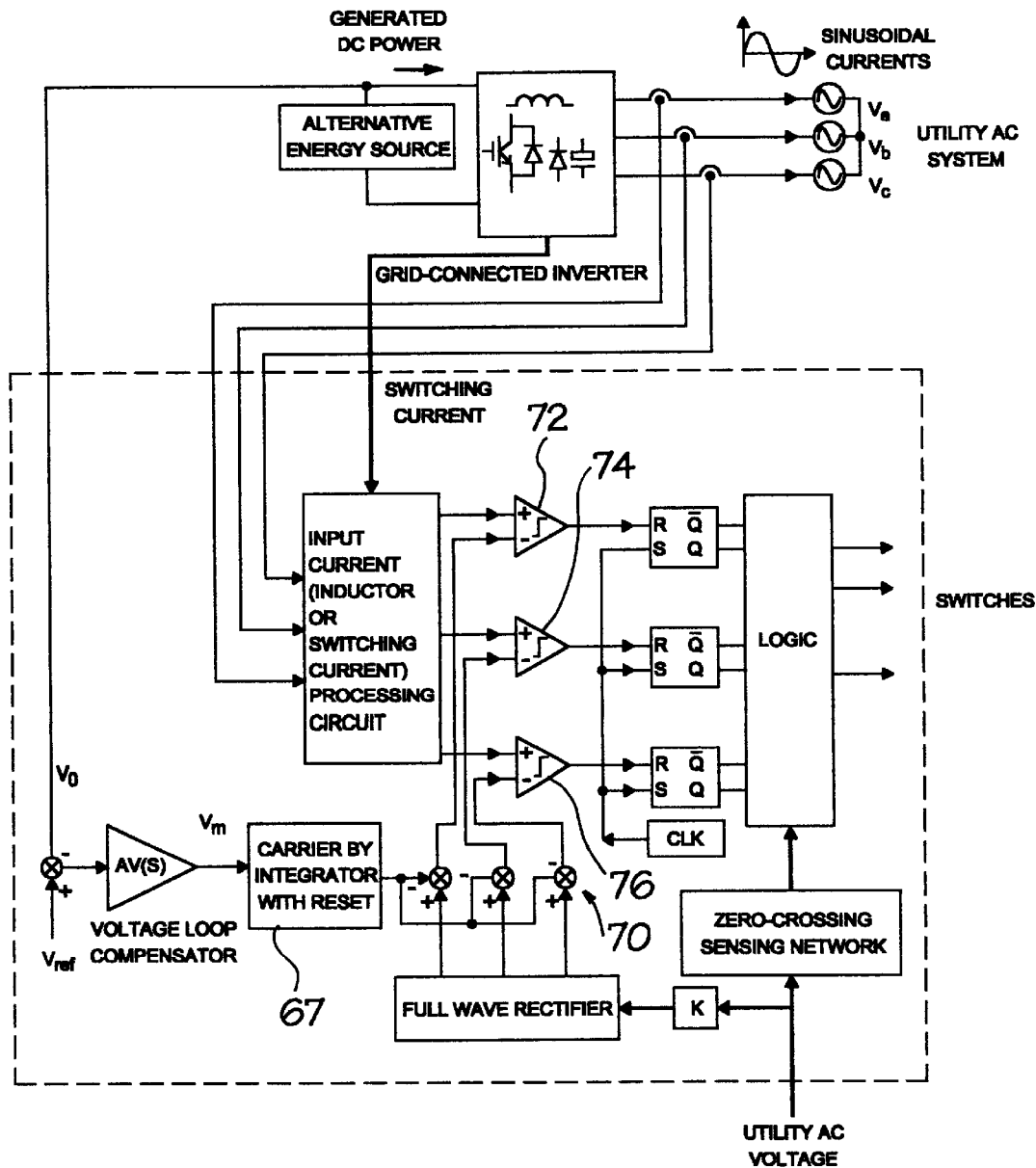
FIG. 10 is a schematic diagram of a UCI controlled grid-connected inverter having a bipolar control mode.

In the embodiment of FIG. 9 the control circuit for vector control is comprised of an integrator 54 having an input with a reset circuit and having its output coupled to the input of two adders 56 and 58. The adders 56, 58 have another input that is coupled to the output of a region selection circuitry 61. The output of the adders are coupled to two comparators 63 and 65.

3.2 Bipolar Operation Mode

In the embodiment of FIG. 10, the control circuit for bipolar operationl is comprised of an integrator 67 having an input with a reset circuit and having an output coupled to the input of an adder 70. The adder 70 has another input that is coupled to the input of the integrator 67. The output of the adder 70 is coupled to three comparators 72, 74 and 76.

A unified constant-frequency integration (UCI) control of the grid-connected inverters as described above is based on one-cycle control. This control method employs the integrator 67 with reset as the core component to control the duty ratio of the grid-connected inverter and to realize net sinusoidal current output to the ac source. Compared to previously proposed control methods, the UCI controller features simpler circuitry, without any requirement for multipliers. Since the output current compensation is performed cycle by cycle, the compensated output currents matche the three-phase ac voltages closely. Thus unity power factor and low total harmonic distortion are achieved.

Simulation result shows that the grid-connected inverter of the present invention has excellent output using many different nonlinear loads. This control method is also applicable to most other inverters. Grid-connected inverters with UCI controller provide a cost-effective, highly reliable, and flexible solution for alternative energy source power generation. Due to the simplicity and generality of the circuitry, it is very suitable for industrial production.

Digital implementation of the UCI control method can be realized by programming the control key equation and the supporting logic and linear functions, into a DSP chip. Since control key equation and the supporting logic and linear functions are very simple, a low cost DSP can be employed.

A more detailed discussion of the background and the features associated with this aspect of the invention is set forth in Section 3, entitled Three-phase power Factor Corrected Inverters Interface for Alternative Energy Sources with UCI Control, and beginning on page 3–1 of ATTACHMENT A.

Many alterations and modifications may be made by those having ordinary skill in the art without departing from the spirit and scope of the invention. Therefore, it must be understood that the illustrated embodiments have been set forth only for the purposes of example; accordingly they should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, deemed to include not only the combination of elements which are literally set forth, but all equivalent structure, material or acts for performing substantially the same function, in substantially the same way, to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the basic concept of the invention.

What is claimed is:

1. A power factor corrected rectifier, comprising:

a one-cycle control circuit having properties for implementing a power factor correction given by the formula $$I_s = \frac{1}{R_e} \cdot V_s$$

where:

$I_s$ is a matrix vector representing input source current;

$V_s$ is a matrix vector representing input source voltage;

a converter included in the control circuit and operable in accordance with the formula $$V_s = V_c \cdot M(D)$$

where:

M(D) is a conversion maxtrix representing a function of the duty cycle D; and $V_c$ is the dc output voltage; and the performance of the control circuit is given by $$I_s = \frac{V_c}{R_e} \cdot M(D).$$

2. The power factor corrected rectifier recited in claim 1 wherein the implementation of the control circuit is classified in one of a vector control mode and a bipolar control mode.

3. A power factor corrected active power filter, comprising:

a one-cycle control circuit having an active power filter function giving by $$I_s = \frac{1}{R_e} \cdot V_s$$

where:

$I_s$ is the source current matrix;

$V_s$ is the source voltage matrix; and $R_e$ is the equivalent resistance with which the source is loaded;

a boost-derived converter included in the control circuit and adapted to operate in accordance with the formula $$V_s = V_c \cdot M(D)$$

where:

M(D) is a conversion matrix, a function of the duty cycle D; and $V_c$ is the dc rail voltage; and the inverter having properties for operating in accordance with a control equation $$I_s = \frac{V_c}{R_e} \cdot M(D).$$

4. The power factor corrected active power filter recited in claim 3 wherein the implementation of the control circuit is classified in of a vector control mode and a bypolar mode.

5. A power factor corrected grid-connected inverter, comprising:
   a one-cycle control circuit having an active power filter function given by $$I_s = \frac{1}{R_e} \cdot V_s$$

where:
   $I_s$ is the three phase output current matrix;
   $V_s$ is the three phase output voltage; and
   $R_e$ is the equivalent resistance with which the output is loaded;
   a buck-derived converter coupled to the control circuit and adapted to operate in accordance with the formula $$V_s = V_c \cdot M(D)$$

where:

M(D) is a conversion matrix, a function of the duty cycle D; and $V_c$ is the input dc voltage; and the inverter having properties for operating in accordance with a control equation $$R_s \cdot I_s = (K \cdot V_s - V_m \cdot M(D)).$$

6. The power factor corrected grid-connected inverter recited in claim 5 wherein the implementation of the control circuit is classified in one of a vector control mode and a bipolar control mode.

* * * * *

UNITED STATES PATENT AND TRADEMARK OFFICE
CERTIFICATE OF CORRECTION

PATENT NO.    : 6,297,980 B1
DATED         : October 2, 2001
INVENTOR(S)   : Smedley et al.

It is certified that error appears in the above-identified patent and that said Letters Patent is hereby corrected as shown below:

Column 10,
Line 24, after "input source voltage;" insert -- $R_e$ is the equivalent resistance with which an output is loaded; --.
Line 31, delete "maxtrix" and insert -- matrix --.

Column 11,
Line 7, delete "bypolar" and insert -- bipolar --.
Line 19, delete "the output" and insert -- an output --.

Column 12,
Line 5, add -- $R_m = R_s V_c / R_e$; --.

Signed and Sealed this

Fourteenth Day of January, 2003

JAMES E. ROGAN
*Director of the United States Patent and Trademark Office*